United States Patent Office 3,492,362
Patented Jan. 27, 1970

---

3,492,362
PROCESS FOR THE ISOLATION OF CYCLIC SATURATED HYDROCARBONS FROM HYDROCARBONS BY EXTRACTIVE DISTILLATION
Gottfried Nettesheim, Wesseling, near Cologne, Germany, assignor to Union Rheinische Braunkohlen-Kraftstoff Aktiengesellschaft, Wesseling, Cologne, Germany, a corporation of Germany
No Drawing. Filed July 18, 1967, Ser. No. 654,067
Claims priority, application Germany, Aug. 12, 1966,
U 12,989, U 12,990
Int. Cl. C07c *3/00;* B01d *3/34*
U.S. Cl. 260—666                    9 Claims

ABSTRACT OF THE DISCLOSURE

Isolation of cyclic saturated hydrocarbons containing 6 or 7 carbon atoms from narrow boiling range hydrocarbon mixtures containing said cyclic hydrocarbons by hydrogenating unsaturated components of said mixture and extractively distilling with a solvent which is a liquid or low melting point organic compound and is an ester obtained by reacting phthalic acid, phosphoric acid or carbonic acid with a cyclic compound containing a free hydroxyl group or a lower chlorinated aliphatic alcohol or a product obtained by reacting ethylene glycol or its mononitrile with a phenol or aromatic alcohol.

FIELD OF INVENTION

This invention relates to a process for the isolation of cyclic saturated hydrocarbons with 6 or 7 carbon atoms from a hydrocarbon mixture.

DESCRIPTION OF PRIOR ART

It is known that pure cyclohexane, for example, can be isolated from hydrocarbon mixtures containing benzene, cyclohexane, olefins and paraffins by initially hydrogenating the olefins with selective catalysts. In this reaction, small quantities of the benzene are hydrogenated to give cyclohexane. High-purity benzene is then isolated by liquid-liquid extraction, extractive distillation with selective solvents or azeotropic distillation, and this benzene is subsequently hydrogenated to give pure cyclohexane.

It has been suggested to remove the paraffins and isoparaffins accompanying cyclohexane in hydrocarbon fractions by extractive distillation with phenol, furfurol, aniline, cyclohexanol or dimethyl sulpholan. Due to the inadequate selectivity of these solvents, the cyclohexane obtained in this way is never more than 95 to 98% pure. Accordingly, it has to be recrystallised to increase the purity.

SUMMARY OF THE INVENTION

The present invention provides a process for recovering cyclic saturated hydrocarbons with 6 or 7 carbon atoms from hydrocarbon mixtures with a narrow boiling range containing such hydrocarbons, which comprises hydrogenating any olefins and/or aromatic compounds present in the mixture and isolating cyclic saturated hydrocarbons by extractive distillation, in the presence of an organic compound which is liquid or low-melting under normal conditions, consisting of an ester which is obtained by reacting phthalic acid, phosphoric acid or carbonic acid with a cyclic compound containing hydroxyl groups and/or a lower chlorinated aliphatic alcohol, or a reaction product of ethylene glycol or its mononitrile with a phenol or aromatic alcohol.

DETAILED DESCRIPTION OF INVENTION

The compounds used for the extractive distillation of the aforementioned hydrocarbons according to the invention also make it easier to produce and isolate cyclohexane from mixtures of, for example, pyrolysis benzine containing benzene, cyclohexane, olefins and paraffins. The mixture should be hydrogenated until it is free of benzene, so that there is no need for selective hydrogenation of the olefins, thus avoiding the losses of benzene by which this would be accompanied. If the hydrogenated mixture is subjected to extractive distillation in accordance with the invention, it is possible to isolate not only the cyclohexane formed from benzene by hydrogenation, but also the cyclohexane present in the mixture from the outset, which can, for example, make up 10% of the total recoverable quantity of cyclohexane. In addition, the cyclohexane formed during the otherwise necessary hydrogenation of the olefins is also recovered.

Because they have relative volatilities of 1.9 and higher, it is of particular advantage to use, for example, benzyl phenyl phthalate, dibenzyl phthalate, $\beta$-chloroethyl phthalate, tetrahydrofurfuryl phthalate, phenyl benzyl carbonate, a diphenyl carbonate/phenylbenzyl carbonate mixture, diphenyl cresyl phosphate and diphenyl benzyl phosphate. Benzyl phenyl phthalate and dibenzyl phthalate show the highest selectivity. The use of dibenzyl phthalate is also advantageous because of its very limited tendency to crystallise. Diphenyl benzyl phosphate and diphenyl cresyl phosphate, for example, are very suitable because of their low viscosity and their thermal stability. It is also of advantage to use ethylene glycol monophenyl ether or $\beta$-phenylmethoxypropionitrile because of their high relative volatility.

The following table compares some examples of conventional solvents and solvents used in accordance with the invention for extractive distillation:

TABLE

|  | Relative volatility of 2,4-dimethyl pentane and cyclohexane | Critical solution temperature | | M.P., °C. |
|---|---|---|---|---|
|  |  | Cyclohexane, °C. | Iso-octane, °C. |  |
| Benzyl-phenyl-phthalate | 2.1 | 47 | im. | Liquid |
| Dibenzyl-phthalate | 2.1 | 37 | im. | 40 |
| Diethylene glycol monophenylether phthalate | 2.0 | 80 | im. | 56 |
| Di-$\beta$-chloroethyl phthalate | 1.9 | 69 | im. | Liquid |
| Tetrahydrofurfuryl phthalate | 1.9 | 56 | im. | Liquid |
| A mixture of diphenyl carbonate and phenyl-benzyl carbonate | 2.0 | 3 | 82 | Approx. 30 |
| Dibenzyl carbonate | 1.8 | 11 | 43 | 27 |
| Bis-2-chloroethyl carbonate | 1.8 | 56 | 96 | 8.5 |
| Tri-$\beta$-chloroethyl phosphate | 2.0 | im. | im. | Liquid |
| Triphenyl phosphate | 2.0 |  |  | 50 |
| Diphenylcresyl phosphate | 1.9 | 9 | 86 | −38 |
| Tricresyl phosphate poor in o-isomers | 1.8 | 0 | 51 | −34 |
| Diphenyl-benzyl phosphate | 1.9 | 15 | im. | Liquid |
| Triphenyl phosphate | 3.0 | 33 | im. | 50 |

TABLE—Continued

| | Relative volatility of 2,4-dimethyl pentane and cyclohexane | Critical solution temperature | | M.P., °C. |
|---|---|---|---|---|
| | | Cyclohexane, °C. | Iso-octane, °C. | |
| 2 parts by weight of triphenyl-phosphate+1 part by weight of tri-β-chloroethyl phosphate | 2.0 | 42 | im. | 40 |
| β-Phenylmethoxypropionitrile | 1.9 | 66 | im. | Liquid |
| β-Phenylmethoxypropionitrile | 1.9 | 50 | im. | Liquid |
| β-(m-methylphenoxy)-propionitrile | 1.8 | 51 | 102 | Liquid |
| Ethylene glycol monophenyl ether | 2.0 | 39 | im. | −2 |
| Ethylene glycol monobenzyl ether | 1.9 | 20 | 85 | Liquid |
| Ethylene glycol dibenzyl ether | 1.8 | −9 | 31 | Liquid |
| α-chloropropylene-glycol-γ-phenyl-ether | 2.0 | 25 | 91 | Liquid |
| For comparison: | | | | |
| Aniline | [1] 1.4 | 30 | 80 | Liquid |
| Furfurol | [1] 1.35 | 66 | 101 | Liquid |
| Phenol | 1.6 | 30 | 70 | 40.9 |
| Do | [1] 1.35 | 30 | 70 | 40.9 |

[1] Relative volatility at 80% solvent for n-heptane/methylcyclohexane (according to Griswold et al., Ind. Eng. Chem. 38, 67 (1946).
im.=Immiscible.

To increase the efficiency of the fractionation, by reducing viscosity, it can be of advantage to carry out the extractive distillation at elevated pressure in order thus to be able to increase the temperature in the fractionating column.

EXAMPLE 1

Diphenyl cresyl phosphate was used as the solvent. 5 kg./hour of a mixture of 15% of 2,4-dimethylpentane and 85% of cyclohexane were run into the top third of a steam baffle column containing 150 trays. 35 kg./hour of diphenyl cresyl phosphate were run in just beneath the uppermost tray at the appropriate tray temperature. The bottom temperature was 170° C. and the head temperature was 80° C. The reflux ratio was 8:1. The extract removed from the bottom product and the distillate had the following composition:

| | Extract Bottoms | Distillate |
|---|---|---|
| Cyclohexane, percent | 99.95 | 10.2 |
| 2,4-dimethyl pentane, percent | 0.05 | 89.8 |

EXAMPLE 2

5 kg./hour of a mixture of 15% of isooctane and 85% of methyl cyclohexane were run into the top third of a 150-tray steam baffle column. Diphenyl benzyl phosphate was run in just beneath the uppermost tray at a rate of 35 kg./hour. The reflux ratio was 8:1. The extract removed from the bottom product contained 0.1% of isooctane and the distillate contained 11.5% of methyl cyclohexane.

EXAMPLE 3

3 kg./hour of a mixture of 15% of n-hexane and 85% of methyl cyclopentane were run into the top third of a 125-tray steam baffle column. 25 kg./hour of dibenzyl phthalate were run in just beneath the uppermost tray at the appropriate tray temperature. The bottom temperature was approximately 160° C. and the head temperature was approximately 68° C. The reflux ratio was 8:1.

It was not possible to detect any n-hexane in the bottom product, whilst the distillate contained 9.5% of methyl cycolpentane.

EXAMPLE 4

Ethylene glycol monophenyl ether was used as the solvent. 5 kg./hour of a benzene fraction which had been hydrogenated and then cut, having been originally derived from a benzine fraction obtained through the pyrolysis of light benzine to olefins, were run into the top third of a 125-tray steam baffle column at the temperature of the corresponding tray. In addition to cyclohexane, this product contained 3.8% of 2,4-dimethyl pentane, 2,2-dimethyl pentane, 0.2% of 2,2,3-trimethyl butane, 0.1% of 2,3-dimethyl pentane and 3-methyl hexane and 0.01% of benzene.

30 kg./hour of the aforementioned solvent were run in just beneath the uppermost tray at the appropriate tray temperature. The bottom temperature was 170° C. and the head temperature was 80° C. The reflux ratio was 17:1. The extract removed from the bottom product and the distillate had the following composition:

| | Percent | |
|---|---|---|
| | Extract Bottoms | Distillate |
| Cyclohexane | 99.9 | 35.0 |
| 2,4-dimethylpentane/2,2-dimethyl pentane | 0.02 | 61.2 |
| 2,2,3-trimethyl butane | 0.01 | 3.1 |
| 2,3-dimethyl pentane/3-methyl hexane | 0.06 | 0.7 |
| Benzene | 0.01 | |

EXAMPLE 5

1 kg./hour of a mixture of 15% of n-hexane and 85% of methyl cyclopentane were run into the top third of a 125-tray steam baffle column. 12 kg. of β-phenlymethoxypropionitrile were run in just beneath the uppermost tray. The reflux ratio was 8:1.

The extract removed from the bottom product contained 0.1% of n-hexane, whilst the distillate contained 10.4% of methylcyclopentane.

What I claim is:

1. The process for the isolation of cyclic saturated hydrocrabons with 6 or 7 carbon atoms from hydrocarbon mixtures with a narrow boiling range containing such hydrocrabons, which comprises hydrogenating any olefins and aromatic compounds present in the hydrocarbon mixture and isolating the cyclic saturated hydrocarbons from this mixture as bottoms by extractive distillation, using as selective solvent an organic compound which is liquid or low-melting under normal conditions, consisting of an ester which is obtained by reacting phthalic acid, phosphoric acid or carbonic acid with a cyclic compound containing a free hydroxyl group or a lower chlorinated aliphatic alcohol, or a product which is obtained by reacting ethylene glycol or its mononitrile with a phenol or aromatic alcohol.

2. The process according to claim 1 wherein the extractive distillation is carried out at elevated pressure.

3. The process according to claim 1 wherein the solvent used in the extractive distillation is dibenzyl phthalate.

4. The process according to claim 1 wherein the solvent used in the extractive distillation is benzyl phenyl phthalate.

5. The process according to claim 1 wherein the solvent used in the extractive distillation is diphenyl benzyl phosphate.

6. The process according to claim 1 wherein the solvent used in the extractive distillation is diphenyl cresyl phosphate, 7. The process according to claim 1 wherein the solvent used in the extractive distillation is ethylene glycol monophenylether.

8. The process according to claim 1 wherein the solvent used in the extractive distillation is β-phenylmethoxy propionitrile.

9. The process according to claim 1 wherein the solvent used in the extractive distillation is dibenzyl carbonate.

References Cited

UNITED STATES PATENTS

| | | | |
|---|---|---|---|
| 2,358,129 | 9/1944 | Lake | 203—60 |
| 2,441,827 | 5/1948 | McKinnis | 203—63 |
| 2,632,778 | 3/1953 | Jonach | 260—666 |
| 2,679,472 | 5/1954 | Tooke | 203—60 |
| 3,155,597 | 11/1964 | Cornell et al. | 203—60 |
| 3,169,151 | 2/1965 | Merryfield et al. | 260—667 |
| 3,341,613 | 9/1967 | Hann | 260—667 |

FOREIGN PATENTS 136,038   1/1950   Australia.

WILBUR L. BASCOMB, JR., Primary Examiner

U.S. Cl. X.R.

203—32, 60, 63, 64, 91